United States Patent [19]

Huang et al.

[11] 4,350,728
[45] Sep. 21, 1982

[54] CROSS REINFORCEMENT IN A GRAPHITE-EPOXY LAMINATE

[75] Inventors: Shih L. Huang, Southampton; Edward J. McQuillen, Huntingdon Valley; Robert J. Richey, Jr., Warminster, all of Pa.

[73] Assignee: The United States of America as represented by the Secretary of the Navy, Washington, D.C.

[21] Appl. No.: 193,324

[22] Filed: Oct. 2, 1980

[51] Int. Cl.³ .............................................. B32B 5/12
[52] U.S. Cl. .................................. 428/105; 244/123; 244/133; 428/114; 428/284; 428/364; 428/365; 428/401; 428/408; 428/416
[58] Field of Search ............... 428/284, 285, 292, 293, 428/294, 295, 364, 365, 367, 408, 416, 105, 401, 902, 114, 223; 244/123, 124, 133

[56] References Cited

U.S. PATENT DOCUMENTS

| | | | |
|---|---|---|---|
| 3,657,061 | 4/1972 | Carlson et al. | 428/112 |
| 3,768,760 | 10/1973 | Jensen | 428/105 |
| 3,769,142 | 10/1973 | Holmes et al. | 226/165 |
| 3,772,115 | 11/1973 | Carlson et al. | 428/112 |
| 3,837,985 | 9/1974 | Chase | 428/223 |
| 3,995,080 | 11/1976 | Cogburn et al. | 428/35 |
| 3,995,081 | 11/1976 | Fant et al. | 428/119 |
| 4,020,202 | 4/1977 | Hroft | 428/367 |
| 4,109,435 | 8/1978 | Loyd | 428/408 |
| 4,119,748 | 10/1978 | Verbauwhede et al. | 428/109 |
| 4,153,750 | 5/1979 | Piquilloud | 428/113 |
| 4,168,337 | 9/1979 | Maistre | 428/113 |
| 4,170,676 | 10/1979 | Thomas | 428/113 |
| 4,177,306 | 12/1979 | Schulz | 428/295 |
| 4,252,588 | 2/1981 | Hratsch et al. | 428/105 |

Primary Examiner—James J. Bell
Attorney, Agent, or Firm—R. S. Sciascia; Henry Hansen

[57] ABSTRACT

Interlaminar shear strength of an aircraft wing made of graphite-epoxy laminate is significantly increased by embedding thin steel wires in preselected locations of high stress in alternating rows ±45° to the plane of the laminate before it is cured. This cross wire reinforcement prevents brittle delamination, arrests propagation of delamination and reduces scatter of interlaminar strength.

7 Claims, 5 Drawing Figures

CROSS REINFORCEMENT IN A GRAPHITE-EPOXY LAMINATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to reinforced laminated composites and more particularly to the embedding of specially tailored short steel wires in a direction which will provide the optimum strengthening of the composite laminate against delamination.

In the field of naval aircraft structural development, it has been the general practice to reduce weight and cost and improve performance. In addition, as flight speeds increase and lift augmentation and thrust vectoring are utilized in vertical-short takeoffs/landing aircraft, high-temperature structures are required to withstand the effects of aerodynamic heating and hot exhaust gases. Significant achievements have been made in reducing structural weight by utilizing laminated composite materials such as graphite-epoxy, for temperature applications up to 450° K. The advantages of graphite-epoxy laminates over conventional materials are well known as is evident from the increased utilization of graphite-epoxy in the aircraft industry over the last several years. An inherent weakness of graphite-epoxy laminates is their low interlaminar strength properties. These properties which include both shear and normal strength, reflect the characteristics of the low strength epoxy matrix material and do not exhibit the benefit of the high strength graphite fibers. For this reason, reinforced graphite-epoxy laminates such as shown in U.S. Pat. Nos. 4,109,435 and 3,837,985 have been developed for designs requiring high interlaminar strength. However, these reinforcement techniques are generally located in fixed patterns or along junctions without regard to specific requirements and local loadings. This results in excessive weight in aircraft components and higher costs.

SUMMARY OF THE INVENTION

Accordingly, the general purpose and object of this invention is to extend the application of reinforced graphite-epoxy laminates to structural designs where high interlaminar shear strength is required. Another object is to increase the overall structural efficiency of a graphite-epoxy laminate. Still another object is to provide a reinforced graphite-epoxy laminate which exhibits a nonlinear shear stress and strain behavior permitting sustained shear strains of more than twice the shear strain of nonreinforced specimens. Yet another object is to provide a graphite-epoxy laminate which will allow local shear stress redistribution, prevent brittle delamination and, thus, arrest the propagation of local incipient shear damage when a structure experiences an accidental over-load.

Briefly, these and other objects of the present invention are accomplished by embedding tailored rods in an uncured composite laminate and through any composite laminate substructure. These cross-reinforcement rods are oriented in the direction most effective in resisting delamination of the individual laminate plies and the peeling away of substructure members from the laminate. Application of Local loading to a sample laminate provides through the post analysis of high interlaminar stress measurements a map from which positioning of the rods is determined for future builds of that particular laminate.

These and other objects of the present invention can be more readily understood, and the uniqueness of reinforced graphite-epoxy laminates and more particularly the embedding of rods in the uncured composite laminate plies for increasing the interlaminar shear strength of the laminate more readily appreciated from the following description, taken in conjunction with the accompanying drawings forming a part hereof, in which:

DESCRIPTION OF THE PREFERRED EMBODIMENT

Figure 1:
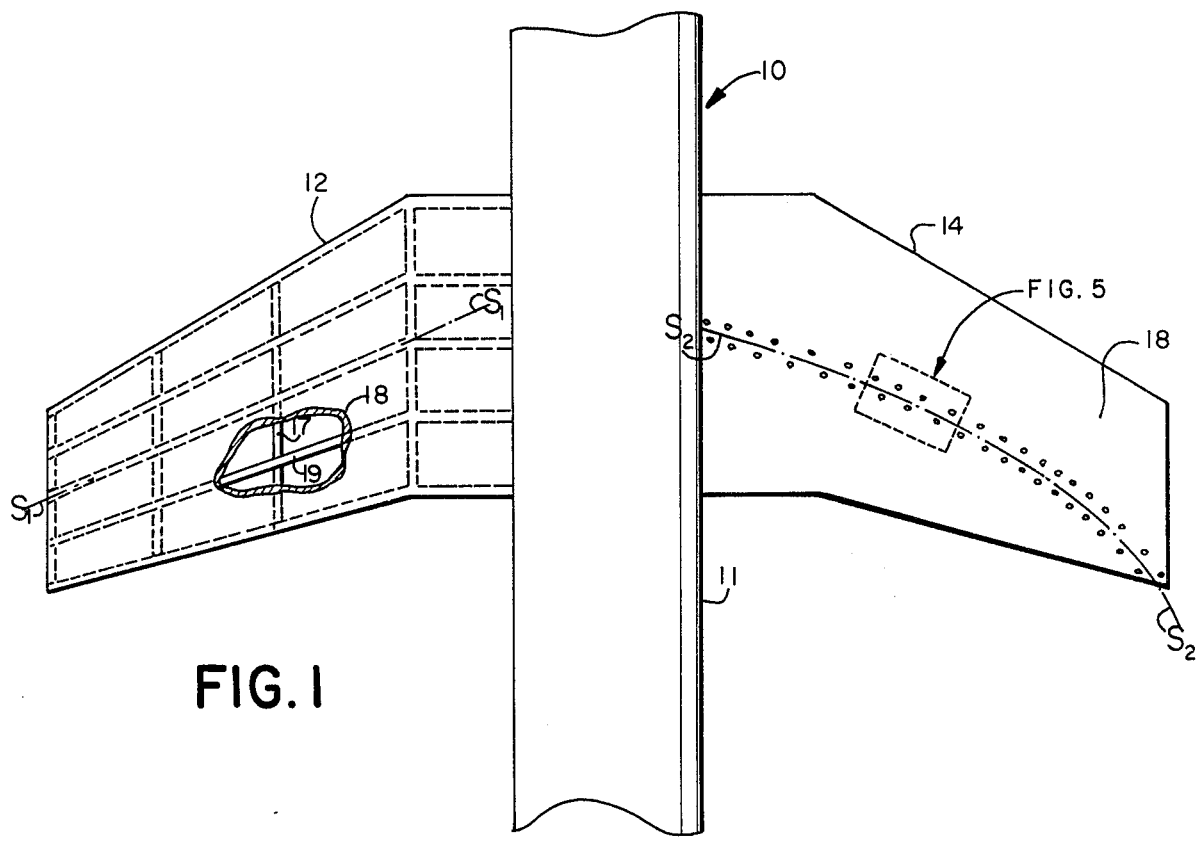
FIG. 1 is a top view of the wings of an aircraft illustrating on the left wing the pattern of spars and ribs supporting the skin of the wings, and on the right wing a local loading stress oriented line.
Figure 5:
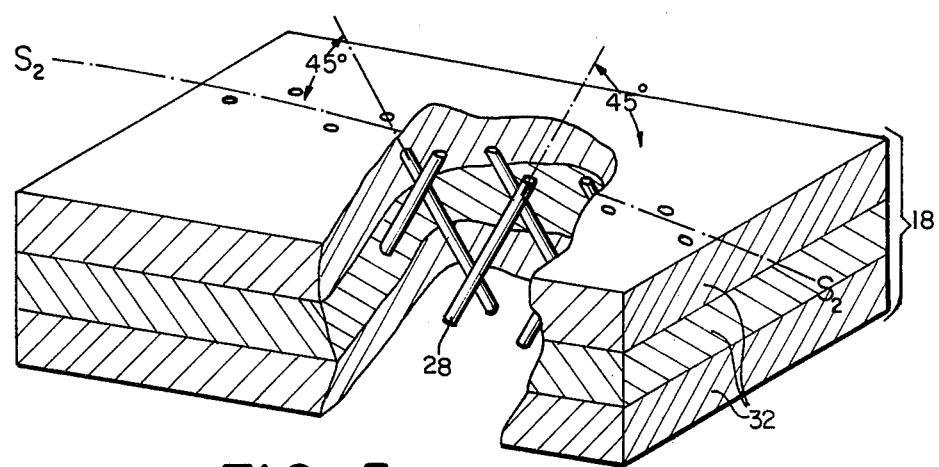
FIG. 5 is a cross-sectional view of a portion of the right wing taken along the stress line $S_2$.
Figure 2:
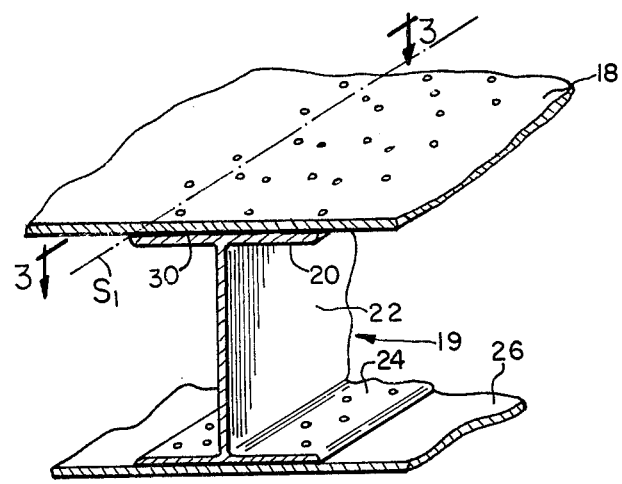
FIG. 2 is an isometric view of a cross-section of a segment of the left wing along one of the spars.
Figure 3:
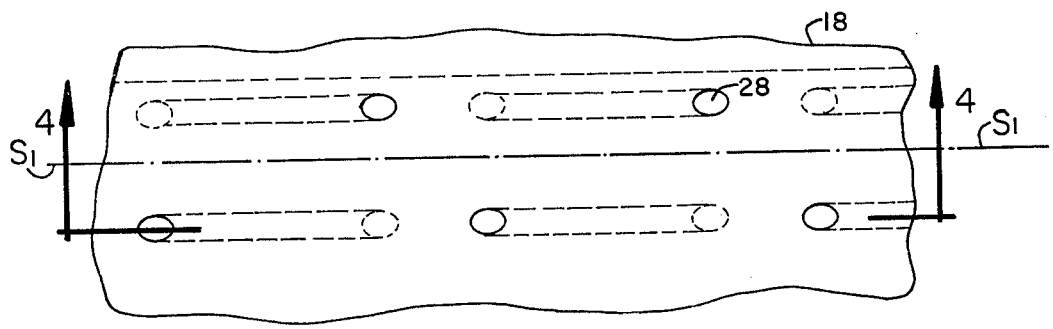
FIG. 3 is a top view of a portion of the segment of the wing of FIG. 2 taken along the stress line $S_1$.
Figure 4:
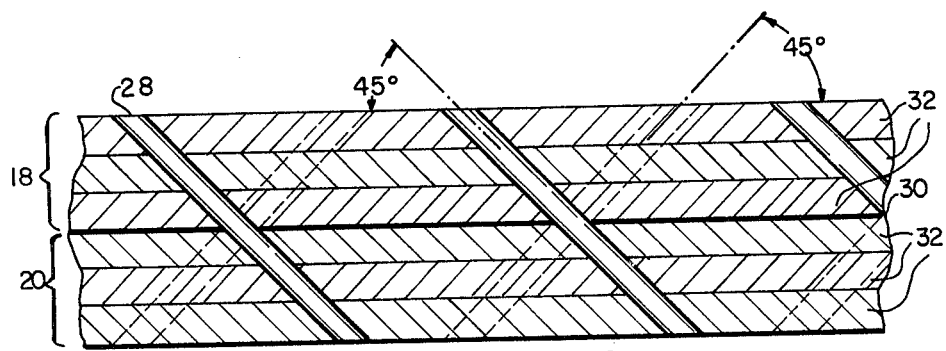
FIG. 4 is a cross-sectional view of the portion of FIG. 3 taken along the line 4—4.

Referring now to the drawings, wherein like reference characters designate like or corresponding parts throughout the several views, there is illustrated in FIG. 1, an aircraft 10 having a fuselage 11, a left wing 12 and a right wing 14. Wing 12 and 14 are covered with a skin 18 and 26 of a fibrous resin or a graphite-epoxy composite having a layup of a plurality of plies 32 bonded together with a thermosetting adhesive forming a laminate. Skin 18 is supported by a substructure consisting of a plurality of ribs 17 and spars 19 both of which are also of a graphite-epoxy composite having a plurality of plies 32 bonded together with a thermosetting adhesive forming a laminate. The pattern of ribs 17 and spars 19 which support skin 18 and 26 are illustrated in FIG. 1. Ribs 17 are short transverse pieces placed at intervals along the length of and giving shape to the aircraft wing. Spars 19 are structural members running along and supporting the ribs 17 of wings 12 and 14. Composite substructures such as spars 19 as illustrated in FIG. 2 are configured in the shape of an "I" beam having an upper parallel horizontal member 20 bonded to the innerside of skin 18 at the upper portion of the aircraft wing and a lower parallel horizontal member 24 bonded to the innerside of skin 26 at the lower portion of the aircraft wing. Parallel members 20 and 24 are joined to form one unitary substructure by a perpendicular member 22. A strong peeling stress at bonding interface 30 between skin 18 and 26 and substructures 17 and 19 is shown in FIG. 2 along a stress line $S_1$. Line $S_1$ intersects the surface of the laminate and is indicative of a plane in which the peeling stress is felt. It is specifically along stress lines such as $S_1$ where rod cross reinforcements 28 consisting of thin steel wires tailored to span the distance from the top of skin 18 through ribs 17 and spars 19 to the bottom of first parallel member 20 and up through skin 26 to the top of second parallel member 24 are locally applied to prevent peeling. The reinforcement rods 28 are inserted into the layup of uncured graphite-epoxy plies 32 and substructure 17 or 19 along a predetermined peeling stress plane such as, for example, $S_1$. As indicated in FIGS. 2 through 4, the rods 28 are inserted as adjacent pairs parallel to said plane and angularly displaced $+45°$ and $-45°$ alternately in opposite directions to a plane normal to said stress plane. Although FIG. 2 only depicts stress line $S_1$ to be oriented in one area along the bonding interface 30 of skin 18 and the upper parallel member 20 of spar 19, it should be understood that similar stress lines are located along all interfaces between skin and substructure. FIGS. 3 and 4 illustrate the locally embedded wire 28 specifically tailored to span the laminates in a direction $+45°$ and $-45°$ to provide the optimum strengthening against interface peeling. For ease of insertion and to minimize fiber breakage in the laminates, wires 28 which range from 0.008 to 0.020 inches in diameter depending on amount of strength required are inserted while the laminates are uncured. FIG. 4 in particular shows the wire 28 extending from the top of skin 18 through three plies of laminate 32 of skin 18 through the bonding interface and through three plies of composite laminates 32 of the upper member 20 of spar 19. The orientation of wires 28 are optimum for allowing tensile and compressive stresses due to transverse pure shear to be partially transferred to and sustained by the wires 28, since the stresses are the maximum in the direction plus 45° and minus 45°. In FIGS. 1 and 5 an interlaminar stress line $S_2$ indicative of a plane of interlaminar stress intersects and is oriented through skin 18 of wing 14. The effect of interlaminar stress is to cause delamination of the individual laminate plies 32. This delamination occurs as a result of the very low strength of the epoxy matrix material and not as a result of the composite fibers of the graphite. FIG. 5, an exploded cross-sectional view of a portion of right wing 14 illustrates the transversely embedded short steel wires 28 oriented in alternating rows of plus 45° and minus 45° to the plane of the laminate. The orientation is optimum for allowing tensile and compressive stresses due to transverse pure shear to be partially transferred to the steel wires 28. Determination of the location of the highest interlaminar stress plane is obtained through strain gage measurements. Computer printouts of the measured date are analyzed and mapped to provide specific wire 28 cross-reinforcement placement necessary for the prevention of delamination of the individual laminate plies 32. It should be noted that skin 18 and 26 are integrally cured to the underlying substructures ribs 17 and spars 19 in one co-cure and bond operation.

Some of the many advantages and novel features of the invention should now be readily apparent. A graphite-epoxy laminate is provided which is reenforced only along high interlaminar stress regions. The laminate is particularly suitable for use in aircraft due to its minimized weight, and low cost. A laminate is also provided which allows local shear distribution, prevents brittle delamination for arresting the propagation of local incipient shear damage due to accidental overload. The laminate is particularly adaptable to easy manufacture and assembly at low cost.

Obviously, many modifications and variations of the present invention are possible in the light of the above teachings. It is therefore to be understood that, within the scope of the appended claims, the invention may be practiced otherwise than as specifically described.

What is claimed is:

1. A lightweight reinforced composite material for use in structures having high stress applications, comprising:

a plurality of plies of a fibrous resin adhesively bonded together to form a laminate; and a plurality of reinforcing rods embedded in said laminate to span the distance between the outer surfaces thereof, said rods being positioned in adjacent pairs along measured critically highest stress planes in said laminate, said pairs being parallel to said stress planes on opposite sides thereof and angularly displaced in opposite directions to planes normal to said stress planes.

2. A composite material according to claim 1 further comprising:

a substructure bonded to said laminate for reinforcing said structures.

3. A composite material according to claim 2, further comprising:

said stress planes being located along the bonded interface of said substructure and said laminate.

4. A composite material according to claim 1, further comprising:

said stress planes being located along the areas of hgh interlaminar stress.

5. The composite material according to claim 1 further comprising:

said rods being angularly displaced alternately plus forty-five and minus forty-five degrees to a plane normal to the stress planes.

6. The composite material according to claim 5 further comprising:

said rods being metallic.

7. The composite material according to claim 6 further comprising:

said rods being of steel wire and having a diameter in the range of 0.008–0.020.

* * * * *